Figure 1:
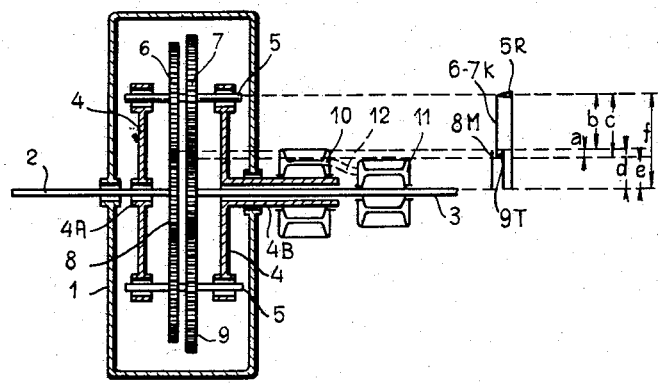

June 19, 1956      E. MIRONE      2,750,812

VARIABLE SPEED TRANSMISSION

Filed Jan. 22, 1952      3 Sheets-Sheet 1

INVENTOR
ELIGIO MIRONE
By Young, Emery & Thompson
ATTYS

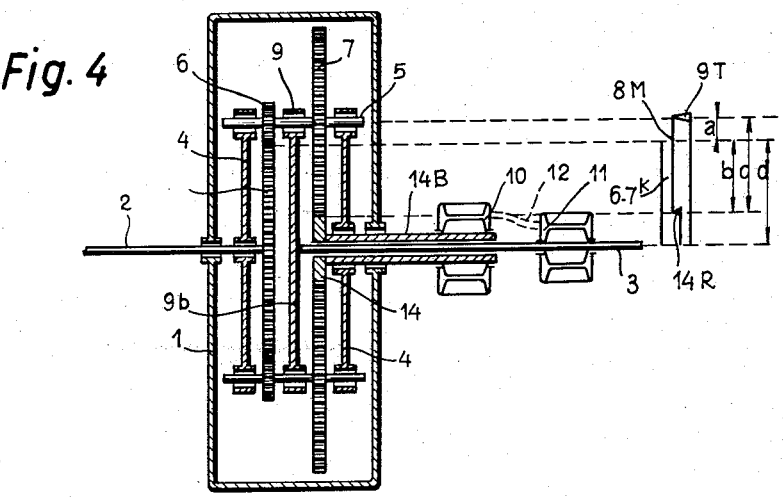
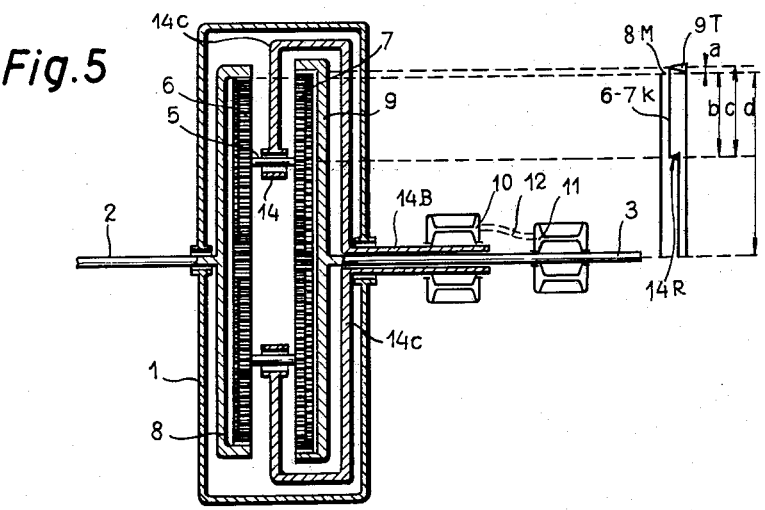
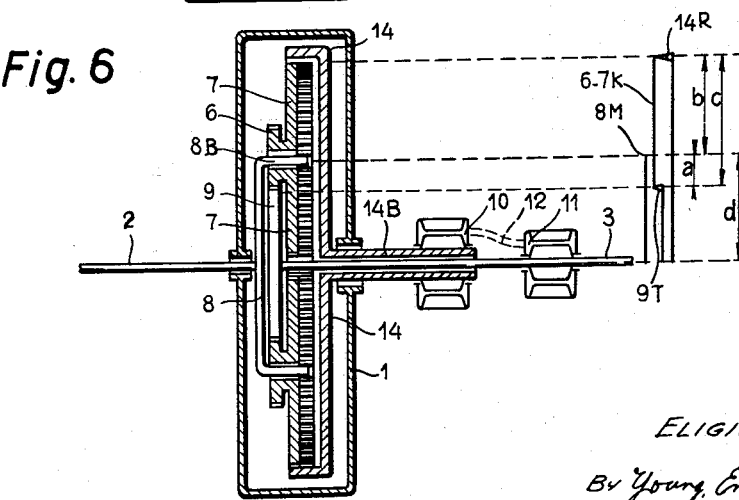

June 19, 1956  E. MIRONE  2,750,812
VARIABLE SPEED TRANSMISSION
Filed Jan. 22, 1952  3 Sheets-Sheet 3

INVENTOR
ELIGIO MIRONE
By Young, Emery & Thompson
Att'ys

United States Patent Office 2,750,812
Patented June 19, 1956

2,750,812

VARIABLE SPEED TRANSMISSION

Eligio Mirone, Turin, Italy

Application January 22, 1952, Serial No. 267,529

Claims priority, application Italy January 24, 1951

2 Claims. (Cl. 74—686)

This invention relates to a variable automatic change speed gear utilising the high efficiency of gear drive and automatic properties of transmission embodying a generator and electromotor unit or a pump and hydraulic turbine unit or conventional mechanical variable transmission, maintaining the efficiency of the whole transmission a high one.

A further object of this invention is to provide, in a variable change speed gear, a reaction member rotating at a moderate speed.

A further object of this invention is to utilise the same members for starting the engine by a dynamotor and to dispense with the friction clutch.

According to this invention the member resisting reaction, instead of being stationary, actuates through a suitable gear, an automatic variable transmission, comprising a generator and electromotor or a mechanical variable transmission, or an hydraulic system, the automatic variable transmission assisting in transmitting power and determining the variation in the total ratio of the whole transmission.

When the two moments on the driving and driven shafts are equal, no power is consumed on the gears.

The total efficiency is near the maximum value, considering that the lower efficiency of the automatic unit but slightly affects the total efficiency.

In order to make the invention understood reference is now made to Figures 1 to 9 of the diagrammatic accompanying drawings, each figure representing a different embodiment.

On the drawing the lever arms drawn beside the various figures are denoted by the numerals of the corresponding members with the additions of the letter M for the driving member, the letter T for the member keyed to the driven shaft, the letter R for the reaction member actuating the small variable transmission, the letter K for the balancing member between the members T and R.

Referring to the example shown in Figure 1, 1 denotes the gearbox, 2 the driving shaft, 3 the driven shaft; 4 denotes a cage rotatable by means of a hub 4a on the shaft 2 and by means of an elongated hub 4B on the shaft 3.

On the cage 4 are rotatably mounted pivots 5, on which two sets of planet toothed wheels 6, 7 are keyed; the wheels are therefore fixedly connected together for rotation.

The planet wheels 6 mesh with the toothed wheel 8 keyed to the driving shaft 2 and the planet wheels 7 mesh with a toothed wheel 9 smaller in diameter, keyed to the driven shaft 3. The sleeve 4B carries the driving member 10 of a continuously variable transmission, of known type of which the driven member 11 is keyed to the driven shaft 3.

12 denotes diagrammatically by dotted lines the connection between the members 10, 11. The variable transmission 10, 11, 12 can be for instance in the form of an electric generator-motor unit, in which the armatures of the members 10, 11 are fixedly connected with the sleeve 4b and shaft 3, respectively, while the stators are fast with a stationary portion. The transmission 10, 11, 12 may also be of an hydraulic or mechanical known type.

As is shown by Figure 1, the torque is transmitted by the engine shaft 2 to the driven shaft 3 over gears 8, 6 and 7, 9, setting up a reaction in the direction of rotation of the driving shaft on the pivots 5, which actuate in turn by a torque smaller in value the respective automatic variable transmission 10, 11, 12 transmitting in turn power to the driven shaft 3.

For the sake of further explanation, the various lever arms have been shown beside the device, showing that the torque, applied to the point 8M, acts on the section of the balancing member 6—7K interposed between the points 5R and 9T.

Observation of this movable member section 6—7K shows that its portion $b$ in length is greater than the portion $a$ in length. It is therefore obvious that, the resisting moment being lower at 5R, a higher resisting moment at 9T is balanced, although the distance $c, d, e, f$ are considered.

This results in a low power fraction transmitted through the pivots 5 (5R) which actuate over the cage 4 and sleeve 4B the small automatic variable transmission 10, 11, 12 which transmits in turn power to the driven shaft 3, while the larger power fraction is transmitted over the toothed wheel 9 (9T) to the driven shaft 3.

When the resisting moment on the driven shaft 3 exceeds the torque at 8 (8M) a delay arises at the point 9 (9T), which is made up for by the acceleration of point 5 (5R) over the balancing member 6—7 (6—7K) (planet wheels), thereby automatically giving the suitable ratio. For the sake of clearness, for instance, with a non-energized electric generator 10, the power transmitted by the point 8 (8M) is fully transmitted to the point 5 (5A) which opposes no resistance since it rotates at a speed higher than the point 8 (8M) and no power is transmitted to the point 9 (9T) and to the driven shaft 3.

On gradually energizing the generator 10, a small power fraction is transmitted through the variable transmission 10—11—12 to the driven shaft 3. Consequently a resisting moment results at the point 5 (5R), which slows down its speed. At the same time the member 6—7 (6—7K) (planet wheels) having its fulcrum on the driving member 8 (8M) produces a power action on the gear 9 (9T) which contributes in turn to the transmission of power in the ratio resulting from the values of both moments (torque on the shaft 2 and resisting moment on the shaft 3) and from the lever arms on the distances $a, b, c, d, e, f$.

The number of revolutions will be the same between the driving shaft 2 and driven shaft 3 (direct drive) when the two resisting moments at 5 (5R) and 9 (9T) balance the torque at 8 (8M). At this stage the device is adjusted.

Summarizing, the power transmission occurs, for its greater fraction, through the members corresponding to numerals 2—8—6—7—9—3 and for the smaller fraction through the members corresponding to numerals 2—8—6—7—5—4—4B—10—12—11—3.

Assuming a given available torque, if the resisting moment in the drive shaft 3 is greater, the point 9 (9T) (gear drive) is delayed with respect to the point 8 (8M)

(torque), thereby determining an acceleration at the point 5 (5R) on account of the difference in angle occurring on the section 6—7K (right-handed rotation of the planet wheels 6—7), a reduced ratio is obtained between the driving shaft 2 and driven shaft 3.

If the resisting moment on the shaft 3 is lower with respect to the driving shaft 2, the point 5—5R previously adjusted produces a resisting moment of such value that, referred to the distances a, b, c, d, e, f, it will exceed the resisting moment at the point 9 (9P), thereby determining an angular displacement over the section 6—7K (left-handed rotation of the planet wheels 6—7) such as to generate a multiplication in ratio between the engine shaft 2 and driven shaft 3.

Consequently, the mechanism operates for demultiplying and multiplying ratios and any variation in torque at 8 (8M) at the different numbers of revolution of the engine constantly exceeds in value the resisting moment at 5 (5R), so as to actuate it at more or less high speed and automatically obtain a resulting ratio, proportionate to the resisting moment on the driven shaft 3. Adjustment of the relatively small variable transmission merely affects the more or less rapid acceleration.

In order to set out more clearly the functional features a high ratio has been given to the reaction determining a high speed in the automatic variable transmission, when the main transmission is geared down. From a constructional point of view, however, this ratio may be suited to practical requirements, for instance, in motor cars it is possible to reduce the ratio to the driven axle and adopt a reduced ratio between the engine and change speed gear.

Figure 2:
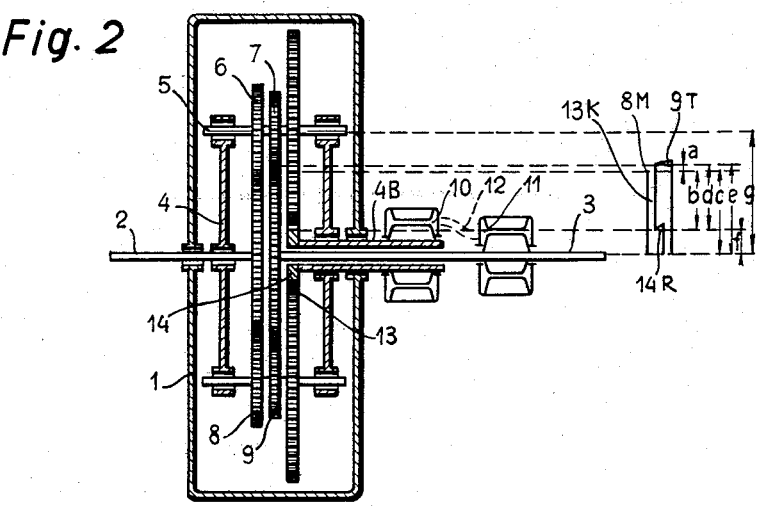

Figure 2 shows the same members as Figure 1, with an additional toothed wheel 13 fixedly connected with the toothed wheels 6 and 7 and loosely mounted bearings for the planet carrying cage. The sleeve 4B, instead of being keyed to the cage 4, is keyed to the toothed wheel 14, which is actuated in turn by the toothed wheel 13.

In this construction the moment actuating the variable speed transmission is nearer to the central axis of the device, in order to take advantage of the different moments with respect to the central axis of the device, and utilise a variable speed transmission of relatively low power with respect to the whole transmitted power.

When power is demultiplied the cage rotates at a speed lower than the driving shaft.

Consequently, operation is as in Figure 1, with the difference that the wheel 13 takes up, reaction and actuates the variable speed transmission through wheel 14 and sleeve 4B in the same direction as the driving shaft, while the cage 4, is idle.

Figure 3:
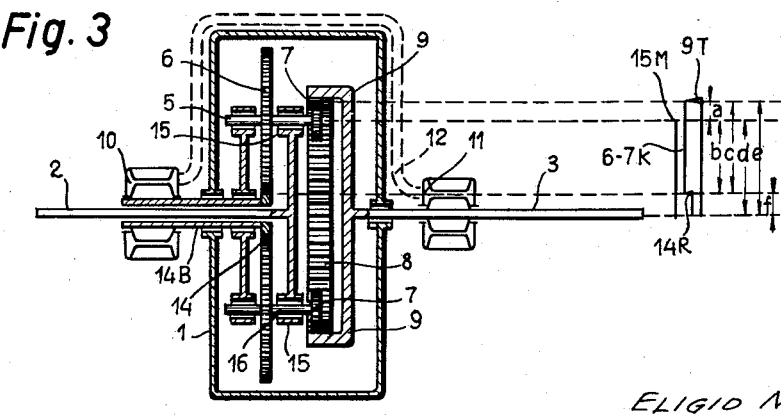

Power is transmitted for the greater fraction through the members 2—8—6—7—9—3 and for the smaller fraction through members 2—8—6—13—14—4B—10—12—11—3. In Figure 3 the driving shaft 2 has fixedly connected thereto the cross member 8 carrying at its ends the bearings 15 for the idle pivots 16 having keyed thereto the smaller diameter toothed wheels 7 and the larger diameter toothed wheels 6, which are fixedly connected together. The toothed wheel 7 meshes with the toothed rim 9 which is fixedly connected with the driven shaft 3, while the toothed wheel 6 meshes with the toothed pinion 14, which is fixedly connected with the extended sleeve 14b actuating the automatic variable speed transmission 10—11—12 which transmits in turn the small power friction to the driven shaft 3. As in the previously described figures, lever arms have been drawn near the figures, which show that the bearings 15 (15M) by rotating the toothed wheels 7—6 (7—6K) transmit power to the members 9 (9T) and 14 (14R), mutually balancing one another, thereby affording a transmission ratio determined by the difference between the values of the torque on the shaft 2 and resisting moment on shaft 3.

Power is transmitted for its greater fraction through the members referred to by numerals 2—8—15—16—7—9—3 and for its smaller fraction through the member 2—8—15—16—6—14—14B—10—12—11—3. In Figure 4, the driving shaft 2 has keyed thereto the toothed wheel 8 which actuates the toothed wheels 9 fixedly connected with the toothed wheels 7 by means of the pivots 5 which are in turn idle on the bearings 9. The bearings 9 are fixedly connected with the cross member 9B keyed to the driven shaft 3. The toothed wheel 7 meshes with the pinion 14 keyed to the extended sleeve 14B which actuates the variable transmission 10—12—11, which actuates in turn the driven shaft 3. The cage 4 merely serves for centering and rotates idly on the shaft 2 and extended sleeve 14B. Besides the figures the lever arms are drawn which correspond to the various members.

It will be obvious that the torque at 8 (8M) acts between the point 9 (9T) and the point 14 (14R) thereby determining a speed ratio depending upon both resisting moments at 9 (9T) and 14 (14R) which are mutually balanced. Power is transmitted for its greater fraction over the members 2—8—6—5—9—9B—3 and for its smaller fraction over the members 2—8—6—5—7—14—14B—10—12—11—3. In this device, when power is demultiplied the planet wheels are delayed with respect to the driving shaft in the same ratio as driven shaft 3.

In the example shown in Figure 5, the toothed rim is keyed to the engine shaft 2 and actuates the planet wheels 6—7 fixedly connected together on the pivots 5 which are idle on the bearings 14. The bearings 14 are fixedly connected through the member 14C to the sleeve 14B which actuates the small variable transmission 10—12—11. The planet wheels 7 mesh with the toothed rim 9 which is keyed in turn to the driven shaft 3. The lever arms drawn beside the figure shown that the torque at 8 (8M) acts on the points 9 (9T) and 14 (14R).

An acceleration at 14 (14R) with respect to the point 8 (8M) made possible by the variable transmission 10—12—11, determines a delay at the point 9 (9T) and, consequently, on the driven shaft 3. Power transmission takes place for its greater fraction over the members 2—8—6—5—7—9—3 and for its smaller fraction over the members 2—8—6—5—14—14C—14B—10—12—11—3.

In Figure 6 the driving shaft 2 has fixed thereto the cross member 8 carrying pivots 8B having idle thereon the planet 6, 7 fixedly connected together. The planet wheel 6 meshes with the toothed wheel 9 keyed to the driven shaft 3, while the planet wheel 7 meshes with the toothed rim 14 fast on its bearing 14B which actuates in turn the small variable transmission 10—12—11.

The torque at 8B (8M) acts over the planet wheels 6—7 (6—7K) on the points 9 (9T) and 14 (14R), thereby determining, as previously described, the suitable ratio between the torque and resisting moment for the variation in speed at the point 14 (14K).

Transmission of torque takes place for its greater fraction over the members 2—8—8B—6—9—3 and for its small fraction over the members 2—8—8B—7—14—14B—10—12—11—3.

Figure 7:
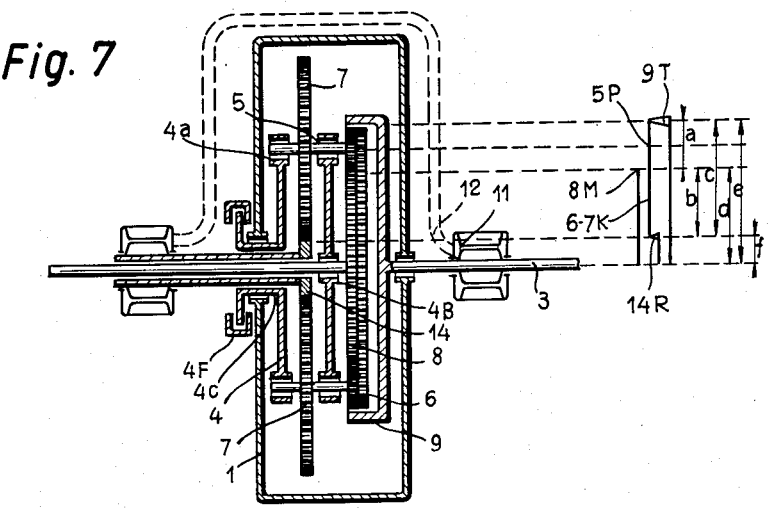

In Figure 7 the toothed wheel 8 is keyed to the driving shaft 2 and meshes with the smaller diameter planet wheel 6 fast on the pivots 5 with the larger diameter planet wheel 7.

The planet wheel 6 meshes in turn with the toothed rim 9 secured to the driven shaft 3.

The planet wheel 7 meshes with the toothed pinion 14 which is keyed to the extended sleeve 14B which actuates the small variable transmission 10—12—11 which drives in turn the driven shaft 3.

The action of torque at the point 8 (8M) determines, as in the previously described cases, over the planet wheel 6—7 (6—7K) a suitable ratio for the two resisting moments at 9 (9T) and 14 (14R) such as to overcome the total resisting moment on the driven shaft 3.

Power is transmitted for its greater fraction over the members 2—8—7—9—3 and for its smaller fraction over the members 2—8—6—7—14—14B—10—12—11—3. The pivots 5 are idle on the bearings 4A of the cage 4 which in turn is supported by the hub 4B on the shaft 2 and by the hub 4C on the extended sleeve 14B.

The hub 4C is extended to provide at 4D a member adapted to be braked by the brake shoes 4F which may be actuated in the most appropriate manner. On braking the member 4D a gradual action takes place on the pivots 5 (5P), whereby the reverse brake on the driven shaft 3 blocks the member 4D and drive is reversed.

It will be obvious that it is convenient in this case to unclutch the variable transmission 10—12—11, for instance by cutting off energizing power, in the case of electric transmission.

Figure 8:
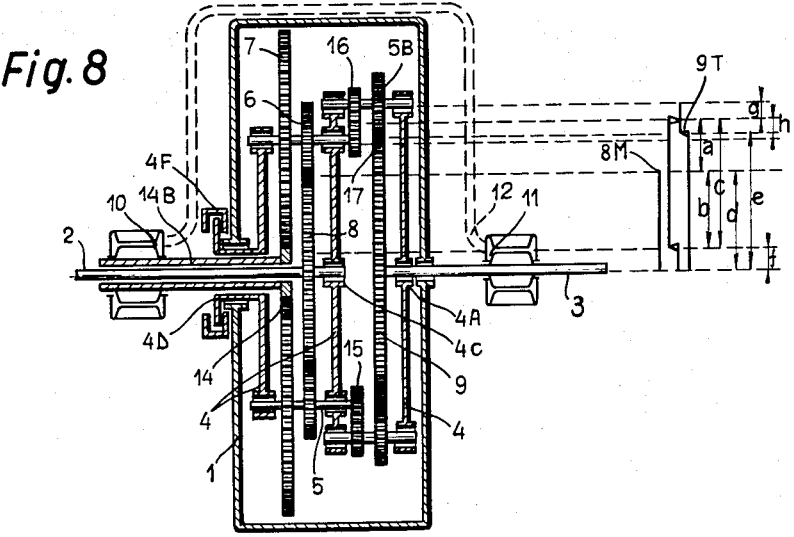

In Figure 8 the toothed wheel 8 keyed to the driving shaft 2 actuates the planet wheels 6 fast over the pivots 5 with the larger diameter planet wheel 7 and the smaller diameter planet wheel 15. The planet wheel 7 meshes, as in the previously described constructions, with the pinion 14 which is keyed to the sleeve 14B actuating in turn the small variable transmission 10—12—11.

The planet wheels 15 mesh with the pinions 16 which are in turn fast with the toothed wheels 17 over the pivots 5B. The toothed wheels 17 actuate the toothed wheel 9 which is keyed to the driven shaft 3. Power is transmitted for the greater power fraction over the members 2—8—6—5—15—16—5B—17—9—3 and for the smaller power fraction over the members 2—8—6—5—7—14—14B—10—12—11—3. The planet wheels 16—17 and pivots 5B are intended for a steeper reduction in ratio, reverse and a balance of reaction occurring between the pivots 5, 5B carried by the same cage in order to further decrease the necessary power on the small variable transmission 10—12—11.

As will be seen from the lever arms placed beside the figures, apart from the action of the point 14 (14R) on the pivots 5, a reverse reaction to the direction of rotation of the point 8 (8M) occurs, while at the point 5B, on account of the resistance of point 9 (9T) a reaction in the same direction as the point 8 (8M) occurs. Consequently, the pivots 5, 5B, being caused to rotate at the same speed, since they are carried by the same cage, balance in part their reaction forces, relieving the necessary power at the point 14R and, consequently, on the variable transmission.

The cage 4 rotates idly on the hubs 4A on the driven shaft 3, hubs 4C on the engine shaft 2 and hubs 4D on the extended sleeve 14B. The sleeve 4B is extended to carry a member adapted to be braked by the braking shoes 4F which, like the previously described ones, can be driven in the most appropriate manner. On braking or blocking of the member 4D the reverse brake or reverse drive is clutched in, as in Figure 7.

Figure 9:
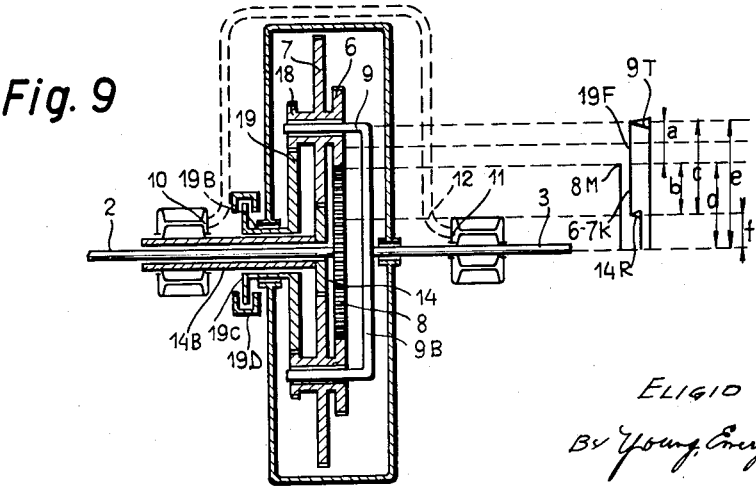

In Figure 9, the toothed wheel 8 keyed to the shaft 2 drives the planet wheels 6 which are fast with the larger diameter planet wheels 7 and the smaller diameter planet wheels 18. The planet wheels 6, 7, 18 are idle on the pivots 9 which are in turn secured to the cross member 9B fast on the driven shaft 3. The planet wheels 7 mesh with the pinion 14 which is keyed to the extended sleeve 14B and drives in turn the small variable transmission 10—12—11.

Operation of the variable transmission is similar to that described in connection with the previous figures. The planet wheels 18 mesh with the toothed wheel 19 keyed to the extended sleeve 19B which rotates idly on the extended sleeve 14B. The extended sleeve 14B carries a member 19C adapted to be braked by the brake shoes 19D which are operated in the most appropriate manner, and are adapted to clutch in reverse brake or reverse drive as shown by the lever arms placed beside 19 (19F), thereby disconnecting 14B (14R) and thereby braking or blocking member 19C and making the variable transmission inoperative.

Power transmission takes place for its greater fraction over the members 2—8—6—9—9B—3 and for its smaller fraction over the members 2—8—6—7—14—14B—10—12—11—3.

In use in connection with motor cars the desired ratio can be obtained between the transmission shaft and engine shaft for braking the car down-hill for, for instance, in the electrically controlled mechanism, by suitably varying the connections or adjusting energizing, the members 11 of the various construction can become generators actuated by the driven shaft and the members 10 can become driving members, thereby maintaining the desired ratio between the driven shaft and driving shaft.

In motor vehicles the engine may be started by employing the members 10—11 of the electrically controlled type, current being supplied to the member 10, so as to rotate it in the same direction as the car engine and causing the member 11 to act at will as a brake in order to keep the car against movement during starting. Upon starting the engine, as the current supply to member 10 is cut out, the engine is disconnected. In order to start the vehicle without employing the friction clutch, energizing is gradually increased through the usual connection over the members 10—11.

What I claim is:

1. In an automatic variable speed transmission a casing, a driving shaft and a coaxial driven shaft supported at the opposite ends of said casing, a cage rotatably mounted about the common axis of said driving and driven shafts, a first set of pivots carried by said cage, a second set of pivots carried by said cage at a radial distance greater than the pivots of the first, a set of trains of three planet wheels fixedly connected together rotatably mounted on the first set of pivots carried by said cage, a set of pairs of planet wheels fixedly connected together rotatably mounted on the second set of pivots carried by said cage, one of the planet wheels of said first set meshing with one of the planet wheels of said second set, a gear fast with said driving shaft and meshing with the second gear of said train of three planet wheels, a small diameter gear fast with a sleeve rotating idly on the driving shaft and meshing with the third larger diameter gear of each of the trains of three planet wheels, a gear fast with said driven shaft and meshing with the second planet wheel of each pair, a driving member of a lower power automatic variable speed transmission carried by said sleeve, a driven member of a lower power variable speed transmission carried by said driven shaft and means for transmitting power between said driving and driven members, and means for braking the rotational movement of said cage.

2. In a variable speed transmission, a driving shaft, a driven shaft coaxial with the driving shaft and spaced thereupon, a first epicyclic train of gearing comprising a set of planet wheels and a sun wheel fast with said driving shaft and cooperating with said planet wheels of said first train, a second epicyclic train of gearing comprising a set of planet wheels and a sun wheel fast with said driven shaft and cooperating with said planet wheels of said second train, a cage idly supported for rotating on at least one of said shafts, and supporting in turn the sets of the planet wheels of said first and second trains of gearing each idly mounted thereon, an automatic small power variable speed transmission interposed between the planet wheels of said first epicyclic train of gearing and the driven shaft, means for transmitting motion from the planet wheels of said first train of gearing to said small power variable speed transmission and means for transmitting movement of the planet wheels of said first train of gearing to the planet wheels of said second train of gearing at a rate lower than that transmitted from the planet wheels of said first train of gearing to said small power variable speed transmission, whereby on the planet wheels of the first and the second trains of gearing opposed reaction forces are generated and the resultant reaction force actuates the automatic small power variable speed transmission and controls the whole variable speed transmission.

References Cited in the file of this patent

UNITED STATES PATENTS

| | | |
|---|---|---|
| 948,436 | Thomas | Feb. 8, 1910 |
| 2,164,504 | Dodge | July 4, 1939 |
| 2,281,077 | Pollard | Apr. 28, 1942 |
| 2,355,000 | Liebrecht | Aug. 1, 1944 |
| 2,517,879 | Howard | Aug. 8, 1950 |

FOREIGN PATENTS

| | | |
|---|---|---|
| 827,268 | France | Apr. 22, 1938 |